United States Patent
Huang (10) Patent No.: US 6,902,421 B1
(45) Date of Patent: Jun. 7, 2005

(54) AUTOMATIC LOCK DEVICE (75) Inventor: Chen Liang Huang, Taichung (TW)

(73) Assignee: Lite-On Technology Corp., Taipei (TW)

( * ) Notice: Subject to any disclaimer, the term of this patent is extended or adjusted under 35 U.S.C. 154(b) by 0 days.

(21) Appl. No.: 10/868,970

(22) Filed: Jun. 17, 2004

(51) Int. Cl.[7] .................................................. H01R 13/62
(52) U.S. Cl. ...................... 439/372; 439/911; 358/487
(58) Field of Search ................................ 439/372, 911, 439/91, 299; 358/487

(56) References Cited

U.S. PATENT DOCUMENTS

| | | | | |
|---|---|---|---|---|
| 4,387,951 A | * | 6/1983 | Hall et al. ................. 439/299 |
| 5,115,374 A | * | 5/1992 | Hongoh ..................... 361/681 |
| 5,467,172 A | * | 11/1995 | Liao .......................... 399/380 |
| 5,949,652 A | * | 9/1999 | McAnally et al. .......... 361/726 |
| 5,986,774 A | * | 11/1999 | Han ........................... 358/487 |
| 6,163,385 A | * | 12/2000 | Kajander ................... 358/475 |
| 6,671,160 B2 | * | 12/2003 | Hayden ..................... 361/212 |
| 2003/0090748 A1 | * | 5/2003 | Fang et al. ................. 358/505 |

* cited by examiner

*Primary Examiner*—Phuong Dinh
(74) *Attorney, Agent, or Firm*—Winston Hsu (57) ABSTRACT

An automatic lock device automatically disengages or forms a lock state of the optical module of a scanner. By plugging and unplugging a power plug on the case of the scanner, a clip departs from or embedded into the optical module. Thus, users can lock or unlock the optical module without other additional operation while transporting the scanner. It avoids possible damages to the optical module.

21 Claims, 7 Drawing Sheets

AUTOMATIC LOCK DEVICE

BACKGROUND OF THE INVENTION

1. Field of Invention

The invention relates to an automatic lock device for the optical module of a scanner and, in particular, to a lock device automatically locking/unlocking the optical module triggered by plugging/unplugging the power plug.

2. Related Art

Due to great advances in the opto-electronic technology, we have digital devices such as scanners, digital cameras, digital video recorders, etc. In particular, scanners have been widely used in paperless office environments because they can quickly covert paper documents into electronic files.

In an ordinary scanner, there are at least a case, a cover, an optical module, and a transmission mechanism. The case is provided with a scan window. The cover is pivotally installed on one side of the case. The optical module and the transmission mechanism are installed inside the case. The optical module which is driven by the transmission module is installed on a carrier so that the optical module can have a reciprocal motion within the range of the scan window. Since the optical module is a movable device relative to the scanner, the manufacturer often installs a lock on the optical module or the carrier in order to avoid damages or defocus of the optical module due to transportation. The lock fixes the optical module (carrier) before the scanner is shipped out. The consumer has to remove the lock before the first use.

However, even with the clear instruction provided by the scanner manufacturer that tells the user to remove the lock before use, many users still forget this step and start the scanner before removing the lock. This often results in damages to the transmission mechanism or the optical module.

To solve this problem, some manufacturers install the lock in the vicinity of the connection port. When the lock fixes the carrier, it blocks the connection port at the same time. The user has to remove the lock in order to connect the cable or power plug to the connection port. This can prevent the user from starting the scanner before removing the lock. However, this method is purely designed for preventing damages during shipping from the manufacturer and when the user first operates the machine. The user may not remember or bother to put on the lock in case he or she needs to move the scanner from one place to another.

SUMMARY OF THE INVENTION

In view of the foregoing, the invention provides an automatic lock device which locks/unlocks the optical module according to the plugging/unplugging action of the power plug. Therefore, it can prevent damages to the optical module, while the user does not need to lock/unlock by other additional operation.

The automatic lock device of the invention includes a clip part and an elastic device. The clip part is provided on the case of the scanner and has an embedding part for fixing the optical module. The elastic device is in touch with the case and the clip part. When the power plug of the scanner is inserted into the case, it pushes the clip part to deform the elastic device. The embedding part then departs from the optical module. When the power plug is unplugged from the case, the elastic device provides an elastic force to restore the embedding part back to its original position, thereby fixing the optical module.

BRIEF DESCRIPTION OF THE DRAWINGS

The invention will become more fully understood from the detailed description given hereinbelow illustration only, and thus are not limitative of the present invention, and wherein.

DETAILED DESCRIPTION OF THE INVENTION

Figure 1A:
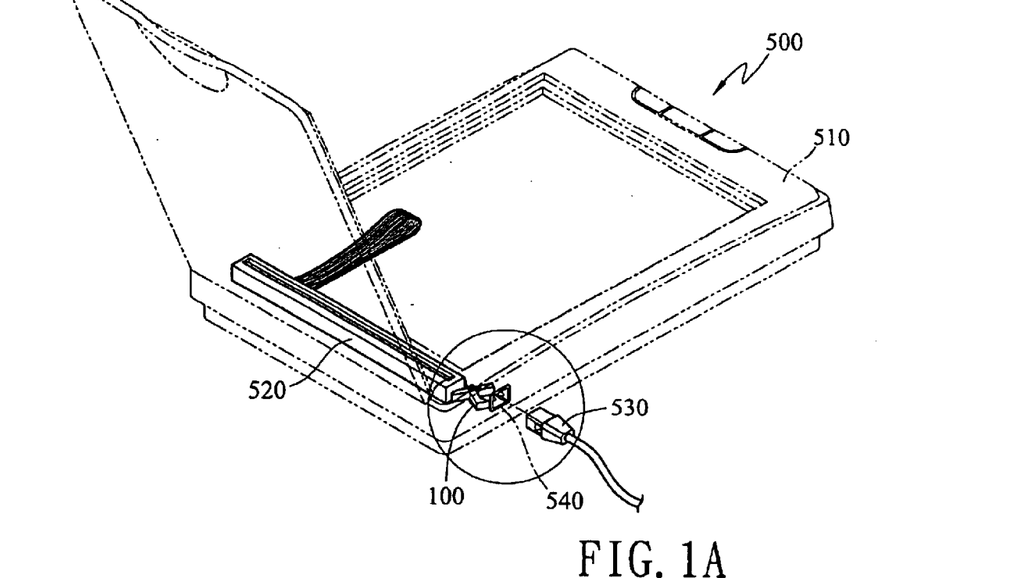
FIG. 1A and 1B are three-dimensional views of the scanner with an automatic lock device according to the first embodiment.
Figure 1B:
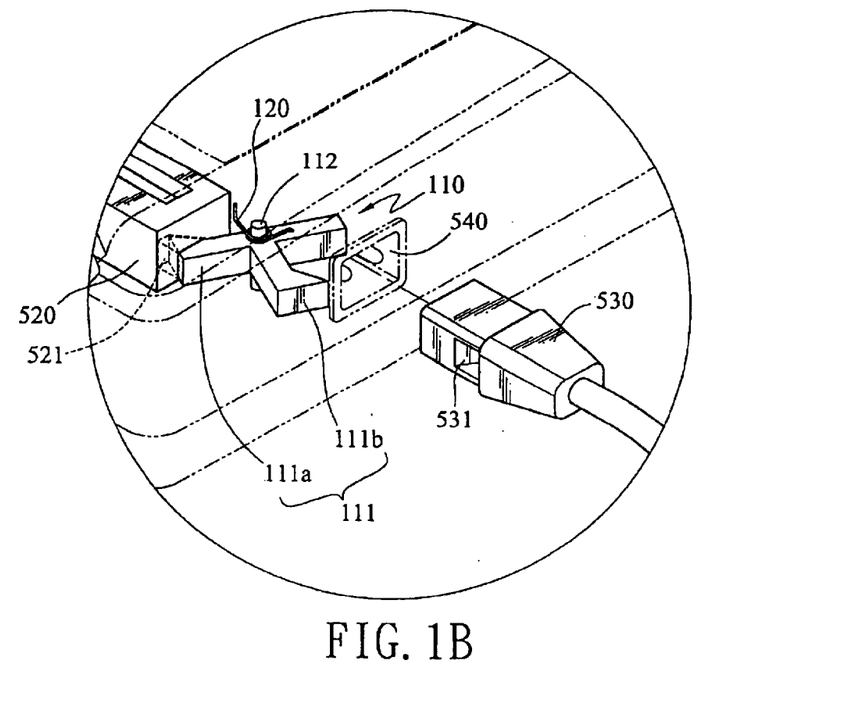

As shown in FIG. 1A and 1B, the disclosed automatic lock device is installed on a scanner 500. The scanner 500 has a case 510 and a power plug 530 that receives a power supply. A power outlet 540 is provided on one side of the case 510 in order for the power plug to receive power. The case 510 is installed with an optical module 520 and other electronic devices for achieving the scanner functions. (To emphasize on the features of the invention, irrelevant electronic devices are not shown in the drawing.) The optical module 520 scans documents. The scanning technique is fairly mature and not the main part of the invention; therefore, we do not describe in further detail herein.

The automatic lock device 100 disclosed herein includes a clip part 110 and an elastic device 120. The clip part 110 is a T-shaped block. It has an L-shaped embedding part 111 and a rotating axis 112 pivotally installed on the case 510. The embedding part 111 rotates about the rotating axis 112 in the case 510. The L-shaped embedding part 111 contains a first end 111a and a second end 111b whose positions correspond to the clipping hole 521 on the optical module 520 and the fixing hole 531 on the power plug 530, respectively. The first end 111a can embed into the clipping hole 521, while the second end 111b can embed into the fixing hole 531.

In the current embodiment, the elastic device 120 is a torsion spring with one end fixed to the rotating axis 112 and with the other end tightly against the case 510. It provides an elastic force to restore the clipping element 110 back to its original state.

Generally speaking, before the power plug 530 of the scanner is plugged into the power outlet 540 to receive power, the optical module 520 is in the standby position. The embedding part 111 of the clipping element 110 is constantly embedded in the clipping hole 521 of the optical module 520, as constrained by the elastic force of the elastic device 120. Therefore, the invention can prevent the optical module 520 from departing from its standby position and from being damaged when not in use or during shipping.

Figure 2A:
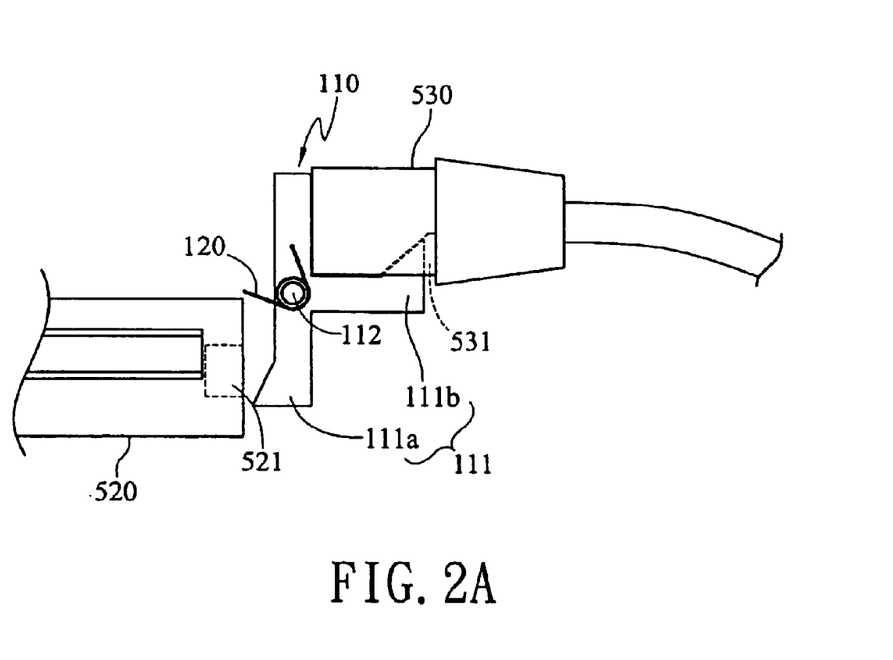
FIGS. 2A and 2B show how the automatic lock device in the first embodiment actions.

As shown in FIG. 2A, when the power plug 530 of the scanner 500 is plugged into the power outlet 540, it simultaneously pushes the top end of the clipping element 110, rotating the clipping element 110. The first end 11*a* of the embedding part 111 is driven to depart from the clipping hole 521 of the optical module 520. On the other hand, the second end 111*b* of the embedding part 111 embeds into the fixing hole 531 of the power plug 530. In this position, the optical module 520 is no longer constrained by the clipping element 110 and is in a free motion state. The power plug 530 is also fixed.

Figure 2B:
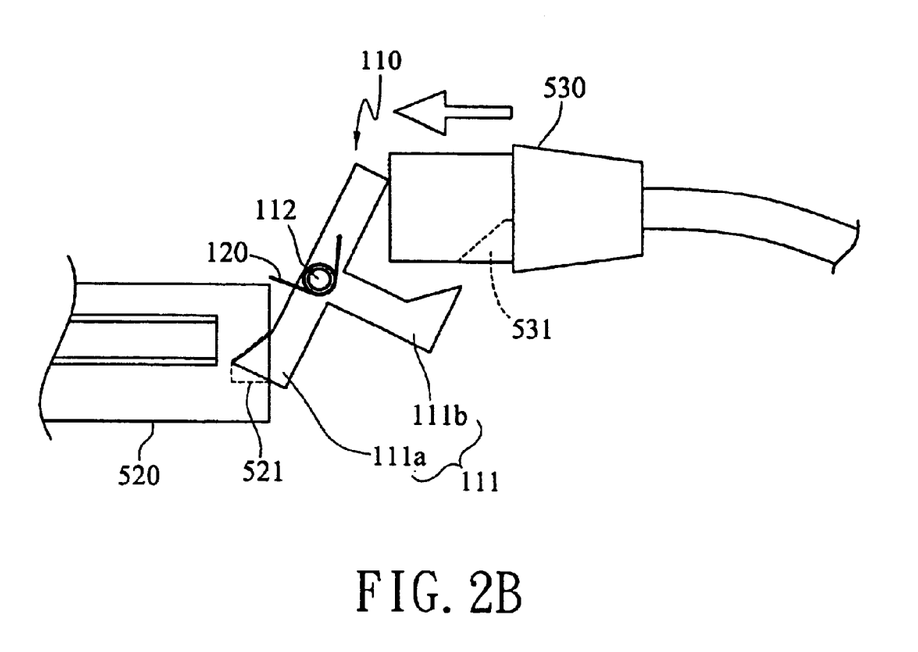

On the other hand, as shown in FIG. 2B, if the user wants to move the scanner 500, he or she only needs to unplug the power plug 530, and then the elastic device 120 provides an elastic force to rotate the clipping element 110 back to its original position, engaging the first end 11*a* of the embedding part 111 into the clipping hole 521 of the optical module 520. Therefore, the user does not need to worry about locking and unlocking. The optical module is protected from being out of focus or damaged during transportation.

Although the elastic device 120 in this embodiment is a torsion spring installed on the rotating axis, the invention has other embodiments in practice. For example, the elastic device 120 can be a spring or chip installed on the case 510, as long as it can provide the necessary elastic force to rotate the clipping element 110 to its original position.

Moreover, the embedding part 111 of the clipping element 110 has an L-shaped in the present embodiment, but the actual applications are not limited to this. The embedding part 111 may have a Y shape or a T shape, as long as its both ends can achieve the effect of clipping into the clipping hole 521 and the fixing hole 531.

Figure 3:
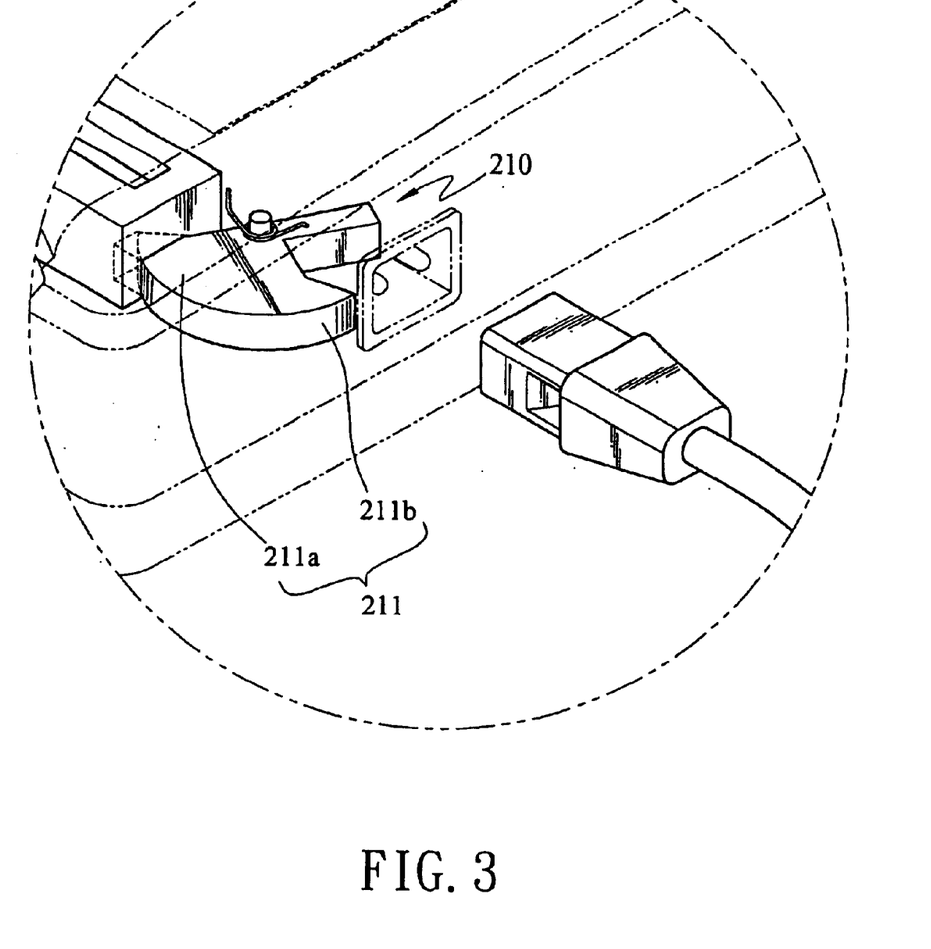
FIG. 3 is a three-dimensional view of the automatic lock device according to the second embodiment.

Alternatively, as the second embodiment shown in FIG. 3, the embedding part 211 of the clipping element 210 has a wedge shape with a protruding first end 211*a* and a second protruding end 211*b* on its edge.

Although the embedding part has two ends to embed into the clipping hole of the optical module or the fixing hole of the power plug, the embedding part nevertheless can have only one end in practice. One needs to provide a corresponding hole on the optical module or the power plug for the single end on the embedding part to engage.

Figure 4A:
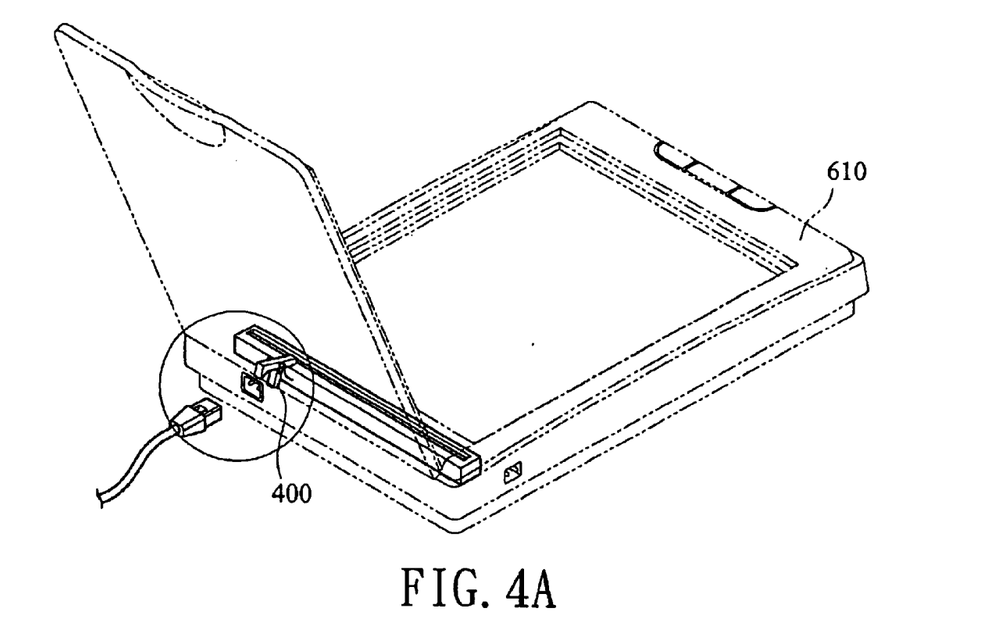
FIG. 4A and 4B are three-dimensional views of the scanner with an automatic lock device according to the third embodiment.
Figure 4B:
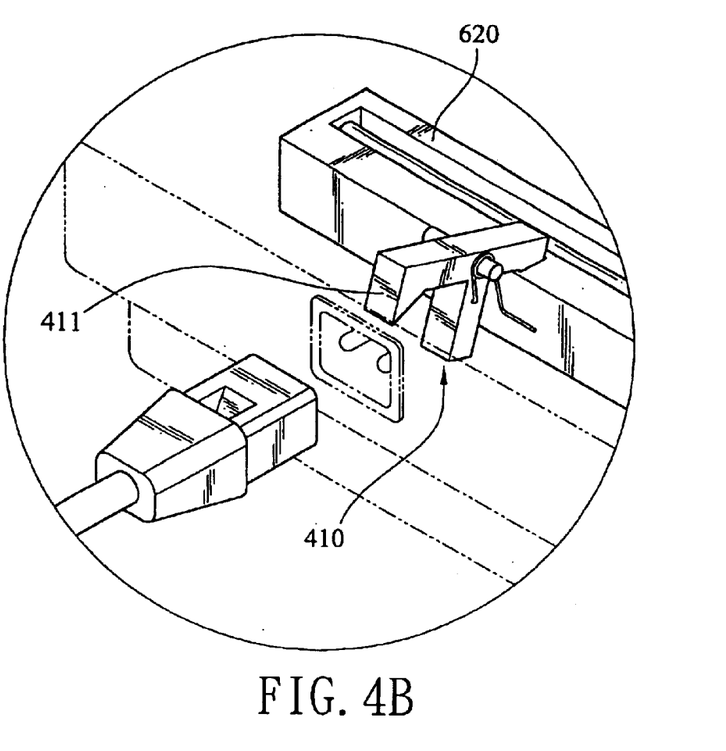

In the above-mentioned embodiments, the clipping part has a horizontal rotating motion. However, other rotational embedding means can be applied too. As demonstrated in FIG. 4A and 4B, the disclosed automatic lock mechanism 400 in a third embodiment is vertically installed on the case 610, so that the embedding part 411 of the clipping element 410 can be embedded on the top portion of the optical module 620.

In addition to the rotational locking mechanism, the invention can achieve the same effect using an automatic lock device with a linear motion.

Figure 5A:
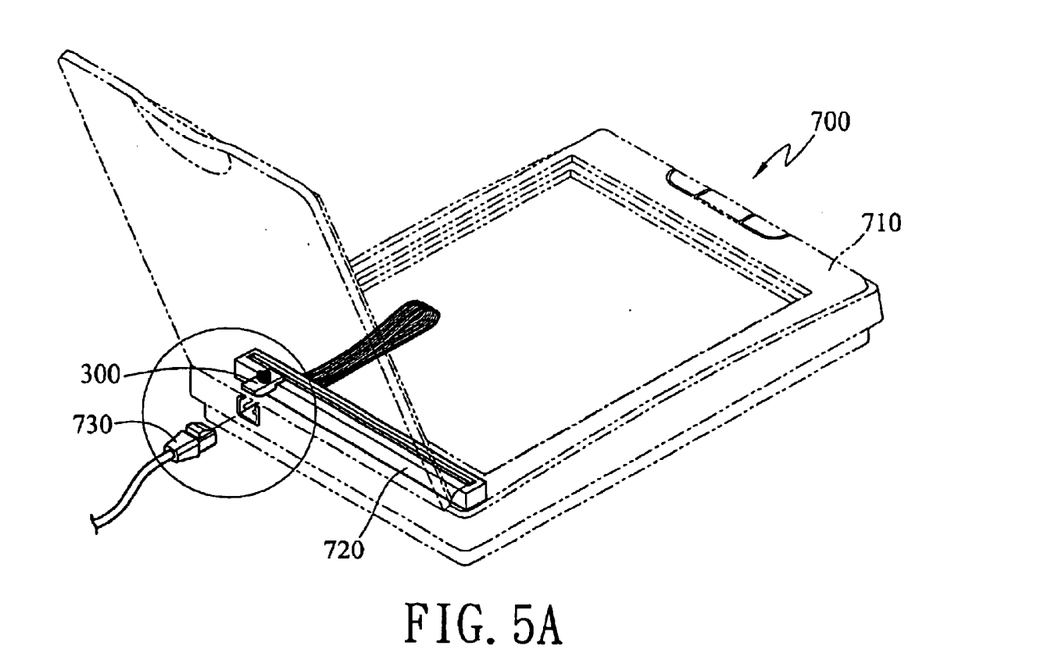
FIG. 5A and 5B are three-dimensional views of the scanner with an automatic lock device according to the fourth embodiment.
Figure 5B:
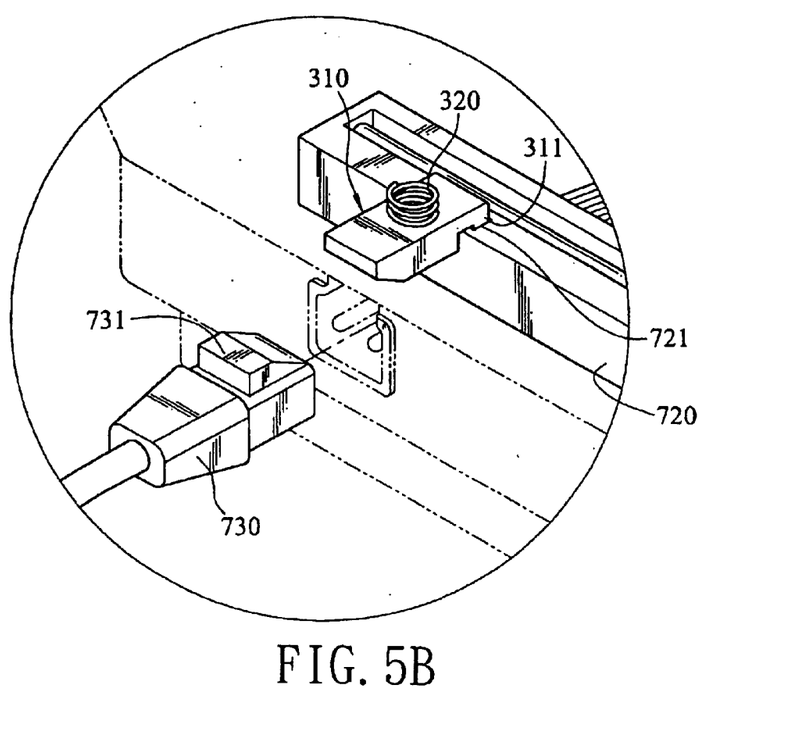

A fourth embodiment of the invention is shown in FIG. 5A and 5B. The automatic lock mechanism 300 is comprised of a clipping element 310 and an elastic device 320. One end of the clipping element 310 has an embedding part 311 protruding downwards (into a hook shape) to match with the clipping hole 721 of the optical module 720. The elastic device 320 can be a spring or a chip inserted between the top surface of the clipping part 310 and the inner wall of the case 710.

Figure 6A:
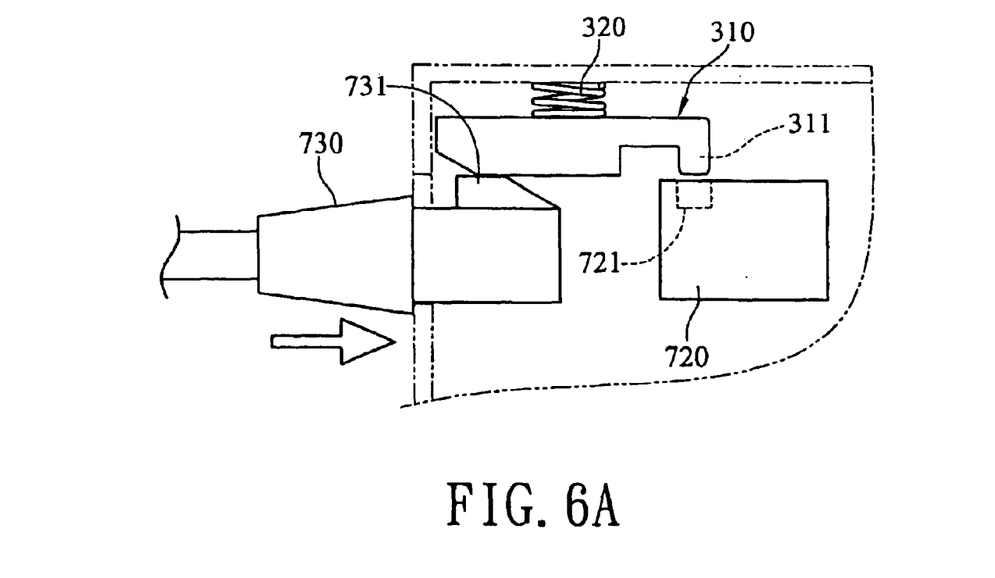
FIGS. 6A and 6B show how the automatic lock device in the fourth embodiment actions.
Figure 6B:
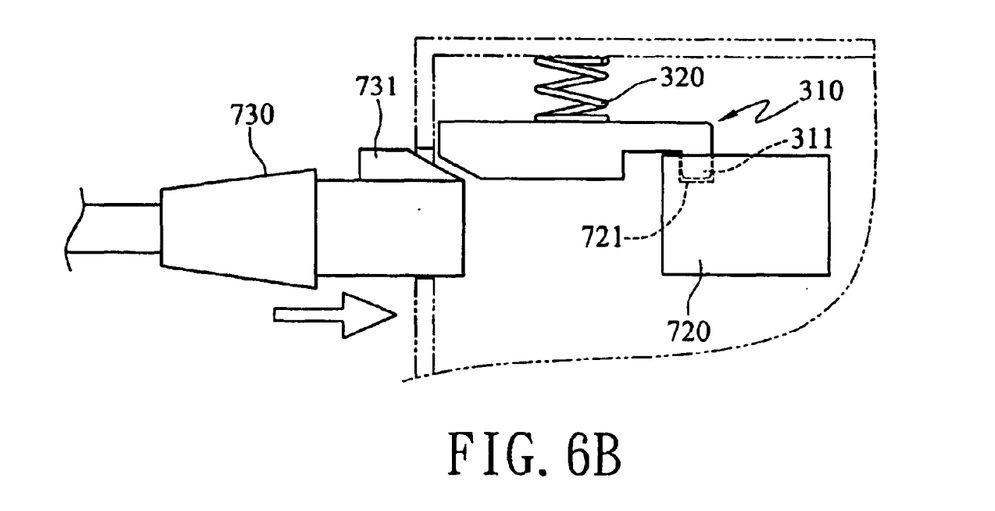

As shown in FIGS. 6A and 6B, the power plug 730 of the invention has a protruding block 731 for raising or lowering the clipping part 310. The embedding part 311 thus engages with or departs from the clipping hole 721 of the optical module 720.

Figure 7A:
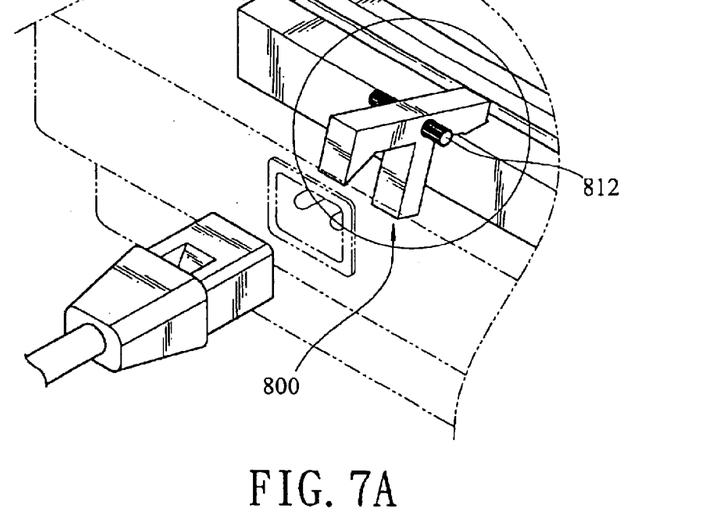
FIG. 7A and 7B are three-dimensional views of the automatic lock device-according to the fifth embodiment.
Figure 7B:
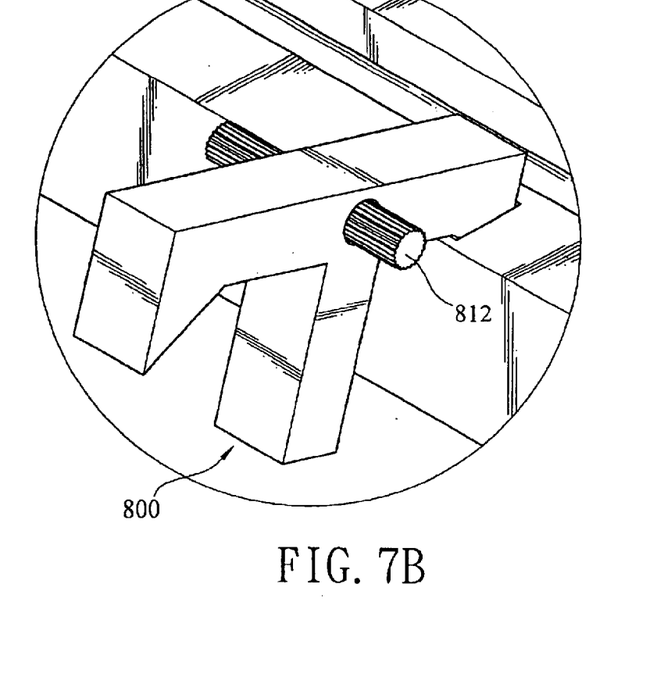

Although the above-mentioned embodiments all use an elastic device to provide the necessary elastic force for the clipping part to press against the optical module or the power plug even after the clipping part moves, the same effect can be achieved using other means. For example, one may use special materials or a rotating axis with a special shape so that the clipping element cannot readily move after rotation. One can also apply a damping oil or grease on the surface of the rotating axis. As shown in FIG. 7A and 7B, the automatic lock device 800 in the fifth embodiment uses a rotating axis 812 with a saw surface. It should be noted that although the above embodiments refer to an optical module as the subject to be locked, the invention can be applied to lock the carrier that carries the optical module too.

Certain variations would be apparent to those skilled in the art, which variations are considered within the spirit and scope of the claimed invention.

What is claimed is:

1. An automatic lock device installed in a scanner containing a case, an optical module, and a power plug, the automatic lock device comprising a clipping element installed on the case and an embedding part for fixing the optical module; wherein when the power plug is plugged into the case, it pushes the clipping element so that the embedding part departs from the optical module, while when the power plug is unplugged from the case, the embedding part restores its original position and fixes the optical module.

2. The automatic lock device of claim 1, further comprising an elastic device in touch with the clipping element and the case to provide an elastic force.

3. The automatic lock device of claim 2, wherein the elastic device is selected from the group consisting of a torsion spring and a leaf spring.

4. The automatic lock device of claim 1, wherein the optical module is formed with a clipping hole for the embedding part to engage.

5. The automatic lock device of claim 1, wherein the embedding part selectively embeds into the optical module or the power plug, one end of the embedding part embedding into the power plug as the power plug is plugged into the case while the other end of the embedding part embedding into the optical module as the power plug is unplugged from the case.

6. The automatic lock device of claim 5, wherein the power plug is formed with a fixing hole for the embedding part to engage.

7. The automatic lock device of claim 1, wherein the embedding part has a shape selected from the group consisting of an L-shaped, a wedge shape and a hook shape.

8. The automatic lock device of claim 1, wherein the clipping element has a T-shaped.

9. The automatic lock device of claim 1, wherein the power plug further includes a protruding block which touches/departs from the clipping part in order for the clipping part to perform a linear displacement.

10. The automatic lock device of claim 1, wherein the clipping element contains a rotating axis for the clipping element to rotate relative to the case.

11. The automatic lock device of claim 10 further comprising a damping oil/grease to provide necessary lubrication and damping on the axis.

12. The automatic lock device of claim 10, wherein the rotating axis has a saw like surface so that the clipping does not rotate freely.

13. An automatic lock device installed in a scanner consisting a case, an optical module, and a power plug, the automatic lock device comprising:

a clipping element, which is installed on the case and has an embedding part for fixing the optical module;

an elastic device, which is in touch with the clipping element and the case;

wherein the power plug pushes the clipping element to deform the elastic device, departing the embedding part from the optical device, as it is plugged into the case;

and the elastic device provides an elastic force to restore the embedding part back to its original position, fixing the optical module, as the power plug is plugged out of the case.

14. The automatic lock device of claim 13, wherein the optical module is provided with a clipping hole for the embedding part to engage.

15. The automatic lock device of claim 13, wherein the embedding part selectively embeds into the optical module or the power plug, one end of the embedding part embedding into the power plug as the power plug is plugged into the case while the other end of the embedding part embedding into the optical module as the power plug is unplugged from the case.

16. The automatic lock device of claim 15, wherein the power plug is formed with a fixing hole for the embedding part to engage.

17. The automatic lock device of claim 13, wherein the embedding part has a shape selected from the group consisting of an L shape, a wedge shape and a hook shape.

18. The automatic lock device of claim 13, wherein the clipping element has a T shape.

19. The automatic lock device of claim 13, wherein the clipping element contains a rotating axis for the clipping element to rotate relative to the case.

20. The automatic lock device of claim 13, wherein the elastic device is selected from the group consisting of a torsion spring and a leaf spring.

21. The automatic lock device of claim 13, wherein the power plug further includes a protruding block which touches/depart from the clipping part in order for the clipping part to ascend/descend.

* * * * *